US012807094B2

(12) United States Patent
Williams

(10) Patent No.: US 12,807,094 B2
(45) Date of Patent: Nov. 24, 2026

(54) AIRBAG ASPIRATION MODULE SPACING FOR EFFICIENCY OPTIMIZATION

(71) Applicant: Autoliv ASP, Inc., Ogden, UT (US)

(72) Inventor: JD Williams, Roy, UT (US)

(73) Assignee: Autoliv ASP, Inc., Auburn Hills, MI (US)

( * ) Notice: Subject to any disclaimer, the term of this patent is extended or adjusted under 35 U.S.C. 154(b) by 0 days.

(21) Appl. No.: 19/203,155

(22) Filed: May 8, 2025

(65) Prior Publication Data

US 2026/0356318 A1 Nov. 12, 2026

(51) Int. Cl.
*B60R 21/30* (2006.01)
*B60R 21/239* (2006.01)
*B60R 21/261* (2011.01)

(52) U.S. Cl.
CPC .......... *B60R 21/239* (2013.01); *B60R 21/261* (2013.01); *B60R 21/30* (2013.01); *B60R 2021/2612* (2013.01)

(58) Field of Classification Search
CPC ..... B60R 21/239; B60R 21/261; B60R 21/30; B60R 2021/2612
See application file for complete search history.

(56) References Cited

U.S. PATENT DOCUMENTS

| | | | | |
|---|---|---|---|---|
| 3,801,127 | A | 4/1974 | Katler et al. | |
| 3,909,037 | A | 9/1975 | Stewart | |
| 3,910,595 | A | 10/1975 | Katter et al. | |
| 5,605,347 | A | 2/1997 | Karlow et al. | |
| 5,873,598 | A * | 2/1999 | Yoshioka | B60R 21/2171 280/740 |
| 9,039,038 | B2 | 5/2015 | Breed et al. | |
| 10,124,759 | B2 | 11/2018 | Smith et al. | |
| 10,913,423 | B2 | 2/2021 | Williams | |
| 11,155,235 | B2 | 10/2021 | Breed et al. | |
| 12,233,809 | B1 * | 2/2025 | Williams | B60R 21/205 |
| 2003/0155756 | A1 * | 8/2003 | Hawthorn | B60R 21/239 280/739 |
| 2018/0079384 | A1 | 3/2018 | Smith | |

(Continued)

FOREIGN PATENT DOCUMENTS

| | | |
|---|---|---|
| EP | 0046275 | 10/1985 |
| WO | 9640556 | 12/1996 |

OTHER PUBLICATIONS

Feb. 21, 2023 International Search Report—PCT/US22/048090 (4 pgs).

(Continued)

*Primary Examiner* — Karen Beck
(74) *Attorney, Agent, or Firm* — Matthew D. Thayne; Thayne and Davis LLC

(57) ABSTRACT

Airbag cushion assemblies for aspirating ambient air and related assemblies. Some embodiments may comprise an inflation module comprising an inflator and a plurality of inflation conduits fluidly coupled with the inflator and configured to deliver inflation gas therefrom through inflation ports. The inflation ports may be configured to, upon actuation of the inflator, draw ambient air into the airbag cushion. The plurality of inflation conduits may be separated from each other and/or other structures in the assembly, such as an aspiration inlet and/or adjacent flow-limiting structures, by various distances intended to optimize aspiration efficiency.

20 Claims, 6 Drawing Sheets

(56) References Cited

U.S. PATENT DOCUMENTS

| | | | | |
|---|---|---|---|---|
| 2019/0126887 | A1* | 5/2019 | Williams | B60R 21/264 |
| 2019/0359167 | A1 | 11/2019 | Breed et al. | |
| 2020/0101933 | A1* | 4/2020 | Williams | B60R 21/26 |
| 2022/0041126 | A1 | 2/2022 | Breed et al. | |

OTHER PUBLICATIONS

Feb. 21, 2023 Written Opinion—PCT/US22/048090 (9 pgs).

PCT/US2026/027439, International Search Report and Written Opinion, dated Jun. 24, 2026 (9 pgs).

* cited by examiner

AIRBAG ASPIRATION MODULE SPACING FOR EFFICIENCY OPTIMIZATION

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection for multiple occupants.

However, existing aspirating airbag assemblies suffer from many drawbacks, such as being large, bulky, and/or complicated, often requiring many different components and valve mechanisms. Such existing assemblies are often complicated and/or unnecessarily difficult to assemble, adding further to costs.

Moreover, although other aspiration systems have been used, they are often less efficient than they could be and have aspiration ratios that can be improved.

The present inventors have therefore determined that it would be desirable to provide systems and methods that overcome one or more of the foregoing limitations and/or other limitations of the prior art. In some embodiments, the inventive concepts disclosed herein may allow for providing an assembly that improves aspiration efficiency by, for example, optimizing various distances in the aspiration housing of the assembly, such as distances between adjacent inflation conduits, distances between inflation conduits and an aspiration inlet of the housing, and/or distances between inflation conduits and adjacent aspirating airflow limiting and/or restricting features, surfaces, and/or components of the housing.

In a more specific example of an aspirating airbag cushion assembly according to some embodiments, the assembly may comprise an airbag cushion; a housing configured to allow for receipt of ambient air into the airbag cushion during inflation of the airbag cushion; and an inflation module. The inflation module may comprise an inflator and one or more inflation conduits (in some cases, a plurality of inflation conduits) fluidly coupled with the inflator and configured to deliver inflation gas from the inflator. Each of the inflation conduits may comprise a plurality of inflation ports through which inflation gas is delivered. Each of the plurality of inflation ports may be configured to, upon actuation of the inflator, draw ambient air into the airbag cushion. Each of the inflation conduits may be separated from each adjacent inflation conduit by a distance of between about 5 mm and about 25 mm.

In some embodiments, wherein each of the inflation conduits may comprise a first end adjacent to the airbag cushion and a second end opposite from the first end, which second end may be adjacent to an aspiration inlet of the housing. A distance between the aspiration inlet and the first end may, in some embodiments, be less than 50 mm. In some such embodiments, the distance between the aspiration inlet and the first end may be between about 10 mm and about 50 mm. In some such embodiments, the distance between the aspiration inlet and the first end may be between 20 mm and 40 mm.

In some embodiments, each of the plurality of inflation conduits may be separated from each adjacent inflation conduit by a distance of between 10 mm and 20 mm.

In some embodiments, a distance between an outermost inflation conduit of the plurality of inflation conduits and a flow-limiting surface of the housing may be between about 5 mm and about 30 mm. In some such embodiments, the distance between the outermost inflation conduit of the plurality of inflation conduits and the flow-limiting surface of the housing may be between 5 mm and 20 mm. In some such embodiments, the distance between the outermost inflation conduit of the plurality of inflation conduits and the flow-limiting surface of the housing may be between 5 mm and 12 mm.

In some embodiments, the plurality of inflation conduits may comprise at least three inflation conduits.

In some embodiments, the flow-limiting surface of the housing may comprise an inwardly projecting surface of the housing.

In another example of an aspirating airbag cushion assembly according to some embodiments, the assembly may comprise an airbag cushion and a housing configured to allow for receipt of ambient air into the airbag cushion during inflation of the airbag cushion. The housing may comprise an aspiration inlet opening configured to receive ambient air into the housing. The assembly may further comprise an inflation module comprising an inflator and at least one inflation conduit fluidly coupled with the inflator and configured to deliver inflation gas from the inflator. The at least one inflation conduit may comprise a plurality of inflation ports through which inflation gas is delivered, wherein each of the plurality of inflation ports is configured to, upon actuation of the inflator, draw ambient air into the airbag cushion. A distance from each of the plurality of inflation ports to the aspiration inlet opening may be less than about 50 mm.

In some embodiments, the distance from each of the plurality of inflation ports to the aspiration inlet opening may be between 10 mm and 50 mm. In some such embodiments, the distance from each of the plurality of inflation ports to the aspiration inlet opening may be between 20 mm and 40 mm. In some embodiments, the distance from each of the plurality of inflation ports to the aspiration inlet opening may be measured between a terminal end of each of the plurality of inflation ports and an external end of the aspiration inlet opening through which ambient air enters the housing.

In some embodiments, a distance from each of the plurality of inflation ports to the aspiration inlet opening may be less than 50 mm.

In another example of an aspirating airbag cushion assembly according to some embodiments, the assembly may comprise an airbag cushion and a housing configured to allow for receipt of ambient air into the airbag cushion during inflation of the airbag cushion. The housing may comprise an aspiration inlet opening configured to receive ambient air into the housing. The assembly may further comprise an inflation module, which may comprise an inflator and a single inflation conduit fluidly coupled with the inflator and configured to deliver inflation gas from the inflator. The single inflation conduit may comprise a plurality of inflation ports through which inflation gas is delivered. Each of the plurality of inflation ports may be configured to, upon actuation of the inflator, draw ambient air into the airbag cushion. A distance between an outer edge of the single inflation conduit and an adjacent flow-limiting surface of the housing may be between about 15 mm and about 45 mm.

In some embodiments, the adjacent flow-limiting surface of the housing may comprise an inwardly-projecting member, such as an inwardly-projecting frame and/or rail-mounting portion or other airbag cushion mounting feature.

In some embodiments, the distance between an outer edge of the single inflation conduit and an adjacent flow-limiting surface of the housing may be between 15 mm and 30 mm.

In some embodiments, a distance between an upper end of the single inflation conduit adjacent to the airbag cushion and the aspiration inlet opening may be less than 50 mm.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
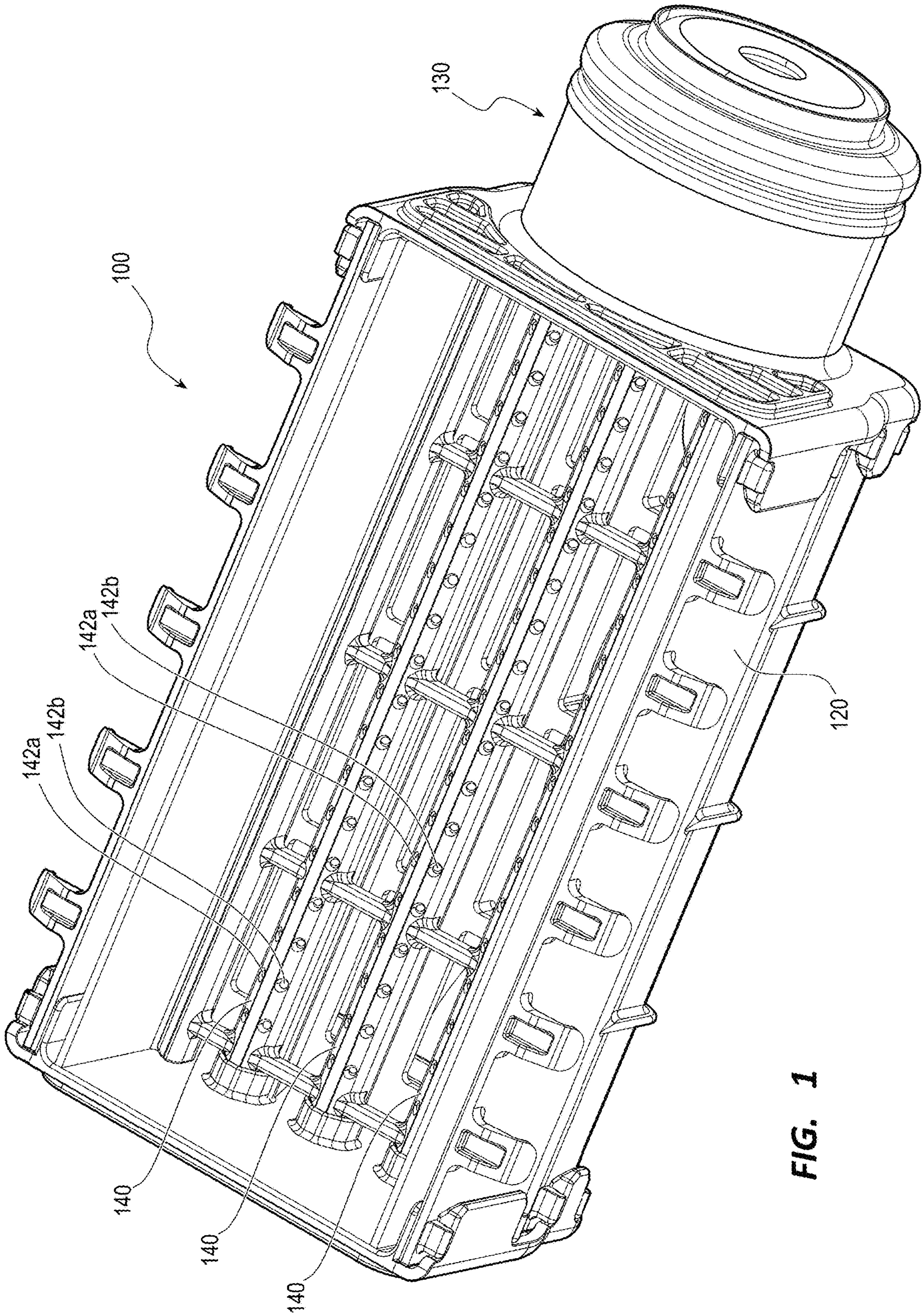
FIG. 1 is a perspective view of an aspirating airbag inflation assembly according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range. It should also be understood that, when a term "about" is used, this provides the teaching that the precise value associated with "about" is also being disclosed and may be claimed without the use of the term "about" as desired.

Apparatus, methods, and systems are disclosed herein relating to aspirating airbag cushion assemblies configured to utilize ambient air, in some cases along with inflation gas, to inflate larger airbag cushions, such as, in some embodiments, airbag cushions for multiple occupants, airbag cushions for autonomous vehicles, or pedestrian airbag cushions. Various embodiments disclosed herein may be configured with specific parameters, such as spacing distances between adjacent inflator inlet tubes, between an inflator inlet tube and an adjacent, flowing limiting surface and/or portion of a housing, and/or between an inlet tube and an aspiration inlet of the housing.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an aspirating airbag cushion assembly 100. Aspirating airbag cushion assembly 100 comprises an airbag cushion package, which includes an airbag cushion (not shown in FIG. 1; see package 210 and cushion 224 in FIG. 3, for example) positioned and configured to deploy therefrom. Aspirating airbag cushion assembly 100 further comprises an aspiration housing 120 coupled to the airbag cushion package. The aspiration housing 120 comprises an open side and/or opening at its upper side for receiving an airbag cushion and/or coupling and/or receiving the airbag cushion and/or cushion package thereto. Aspirating airbag cushion assembly 100 may be attached to aspiration housing 120 with elongated rails in some embodiments (see rails 213 in FIG. 3, for example) to hold the airbag cushion in place for packaging and deployment. Opposite this open side, aspiration housing 120 comprises an aspiration inlet configured to allow for receipt of ambient air into the airbag cushion during inflation.

In the depicted embodiment, the aspiration inlet comprises a plurality of openings aligned in a grid pattern along this side of aspiration housing 120, which openings are defined by cross-members. Inflation conduits 140 are also provided, which inflation conduits 140 may comprise tubes configured with inflation portion 142*a*/142*b*. However, it is contemplated that, in alternative embodiments, the aspiration inlet may comprise a single opening (in some such embodiments, the entire lower side of aspiration housing 120 may be open) or may comprise any other suitable number of openings as desired to allow ambient air to enter the housing 120.

An inflation module 130 may be coupled to the aspiration housing 120. As described in greater detail below, in some embodiments, inflation module 130 may be slidably coupled to the aspiration housing 120. Inflation module 130 comprises an inflator, which inflator may comprise, for example, a disc inflator. However, other embodiments are contemplated in which the inflator may instead comprise another type of inflator, such as a tubular inflator or another suitable inflator.

Aspiration housing 120 may comprise a first or lower side comprising an aspiration inlet, as mentioned above, that may be configured to allow for receipt of ambient air into the airbag cushion during inflation. Aspiration housing 120 may further comprise a second or upper side opposite from the first side that is configured to receive the airbag cushion and/or airbag cushion package therein. A third side of aspiration housing 120 extends between the upper and lower sides/ends and may be closed or at least substantially closed.

This open side or, in other embodiments, one or more openings, may be configured to be closed, or at least substantially closed, by inflation module 130. More particularly, inflation module 130 may be configured to be received in the open side of aspiration housing 120 and to close this side/opening upon being fully coupled with, which in the case of the depicted embodiment means fully slid into, inflation module 130.

As previously mentioned, inflation module 130 further comprises a plurality of inflation conduits 140, such as tubes, which are fluidly coupled with an inflator. Each of the inflation tubes 140 comprises a plurality of inflation or aspiration ports 142 (alternatively referred to as aspiration ports since they assist in drawing ambient air into the cushion during inflation) and each of the inflation tubes 140 and/or ports 142 is configured to deliver inflation gas from the inflator into the airbag cushion. Preferably, assembly 100 is configured such that the inflation gas is delivered at a sufficiently high velocity to draw ambient air through the aspiration inlet and into the airbag cushion during inflation. In alternative embodiments, each of ports 142 may be formed on a nozzle or the like, which may extend from one or more of inflation conduits 140.

In the depicted embodiment of FIG. 1, the inflation/aspiration ports 142 are formed within each inflation conduit 140 in two opposing rows. Thus, ports 142*a* are part of a first row and ports 142*b* are part of a second row. Preferably, these two rows are offset from one another relative to the center of each inflation conduit 140. In other words, if the center is measured perpendicular to the elongated axis of each inflation conduit 140, each of the ports 142*a* in one row is offset from the center towards a first side of the inflation conduit 140, which is preferably adjacent to a first aspiration opening of the aspiration inlet, and each of the aspiration ports 142*b* in a second row of aspiration ports is offset from the center towards a second side of the same inflation conduit 140 opposite from the first side and preferably adjacent to another second aspiration opening of the aspiration inlet. As discussed below and depicted in the embodiment of FIG. 2, in some embodiments, the ports may also, or alternatively, be formed in rows that are staggered and/or offset relative to each other rather than the center of each conduit.

In this manner, the jets/inflation delivered through the ports 142 can be positioned closer to the opposing edges of the conduits 140, which may allow for a more efficient aspiration system by generating better aspiration flow. Without being limited by theory, it is thought that this is because placement of what is preferably a supersonic plume of gas closer to the edge of the tube/conduit 140 positions the low-pressure zone generated by these high-velocity gases closer to where the ambient air is to pull into or aspirate the air at a higher volume more efficiently into the cushion. This may also improve the vacuum pressure to aspirate more ambient air into the cushion relative to the amount of inflation gases needed to generate the flow, thereby preferably making the aspiration ratio of the assembly higher.

It may also be preferred that the ports 142 be spaced apart from one another sufficiently such that the streamlines of the expanding gas do not intersect, or at least intersect minimally. Thus, preferably the ports 142 are spaced apart with the maximum amount of space in between each adjacent port within the area allotted to the aspiration inlet, such as the case in the depicted embodiment.

Figure 2:
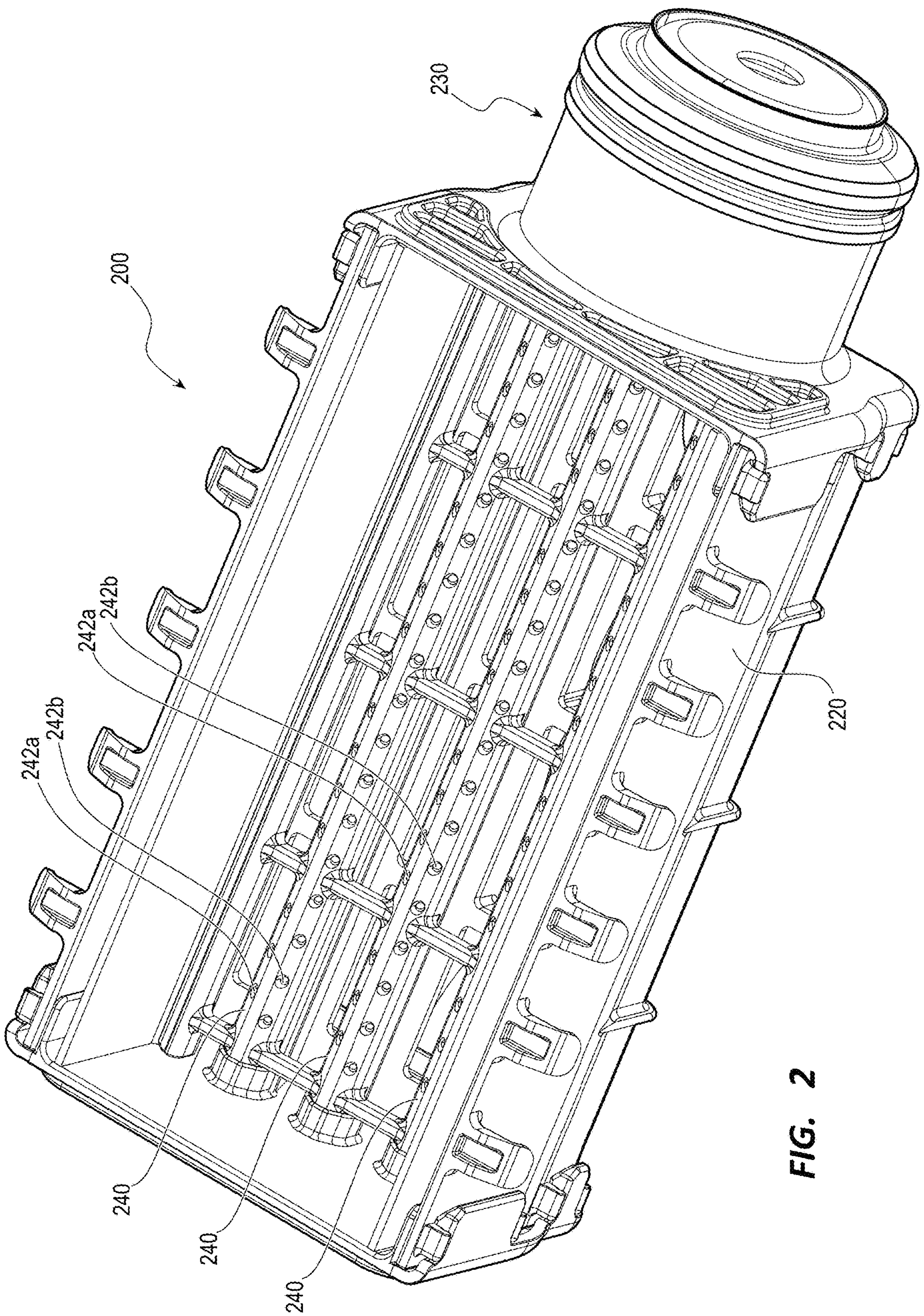
FIG. 2 is a perspective view of an aspirating airbag inflation assembly according to other embodiments.

FIG. 2 depicts an aspirating airbag cushion assembly 200 according to an alternative embodiment. Aspirating airbag cushion assembly 200 comprises an airbag cushion package and/or housing comprising an airbag cushion 224 (the airbag housing and cushion are not shown in FIG. 2 but may be seen in the cross-sectional view of FIG. 3) positioned and configured to deploy therefrom. Aspirating airbag cushion assembly 200 further comprises an aspiration housing 220 coupled to the airbag cushion housing. The aspiration housing 220 may be similar to aspiration housing 120 and may therefore comprise, for example, an aspiration inlet configured to allow for receipt of ambient air into the airbag cushion during inflation.

Similarly, an inflation module 230 may be coupled to the aspiration housing 220. Inflation module 230 may, like inflation module 130, further comprise a plurality of inflation conduits/tubes 240 that are fluidly coupled with the inflator. Each of the inflation tubes 240 again comprises a plurality of inflation or aspiration ports 242 and each of the inflation tubes 240 and/or ports 242 is configured to deliver inflation gas from the inflator into the airbag cushion.

The inflation/aspiration ports 242 are, like ports 142, formed within each inflation conduit 240 in two opposing rows. Thus, ports 242*a* are part of a first row and ports 242*b* are part of a second row. Also like ports 142, these two rows are offset from one another relative to the center of each inflation conduit 240. In other words, if the center is measured perpendicular to the elongated axis of each inflation conduit 240, each of the ports 242*a* in one row is offset from the center towards a first side of the inflation conduit 240, which is preferably adjacent to a first aspiration opening of the aspiration inlet, and each of the aspiration ports 242*b* in a second row of aspiration ports is offset from the center towards a second side of the same inflation conduit 240 opposite from the first side and preferably adjacent to another second aspiration opening of the aspiration inlet.

However, unlike ports 142, the ports 242*a* in the first row are staggered or offset from the ports 242*b* in the second row such that each of the ports 242*a* of the first row is positioned at a location along the elongated axis of the inflation conduit 240 that is in between adjacent port 242*b* in the second row. This staggered feature of assembly 200 may have several benefits. For example, having the ports staggered may provide increased strength to the assembly to improve deployment loading strength. This may also provide for an increased area between the closest ports of the opposing rows to increase part strength.

Other features of the ports and/or the remainder of the assembly 200 may be identical or similar to any of those previously described. For example, ports 242 may, in some embodiments, be angled outward away from the vertical direction, at least initially. In some such embodiments, the ports may be multi-faceted, multi-sectioned, and/or expanded in area from a proximal to distal direction. For example, angled surfaces, such as Prandtl-Meyer expansion angle surfaces, may direct the inflation gas from an initially outward direction to a vertical, or nearly vertical, direction to improve the efficiency of the aspiration of the adjacent, ambient air during deployment.

Figure 3:
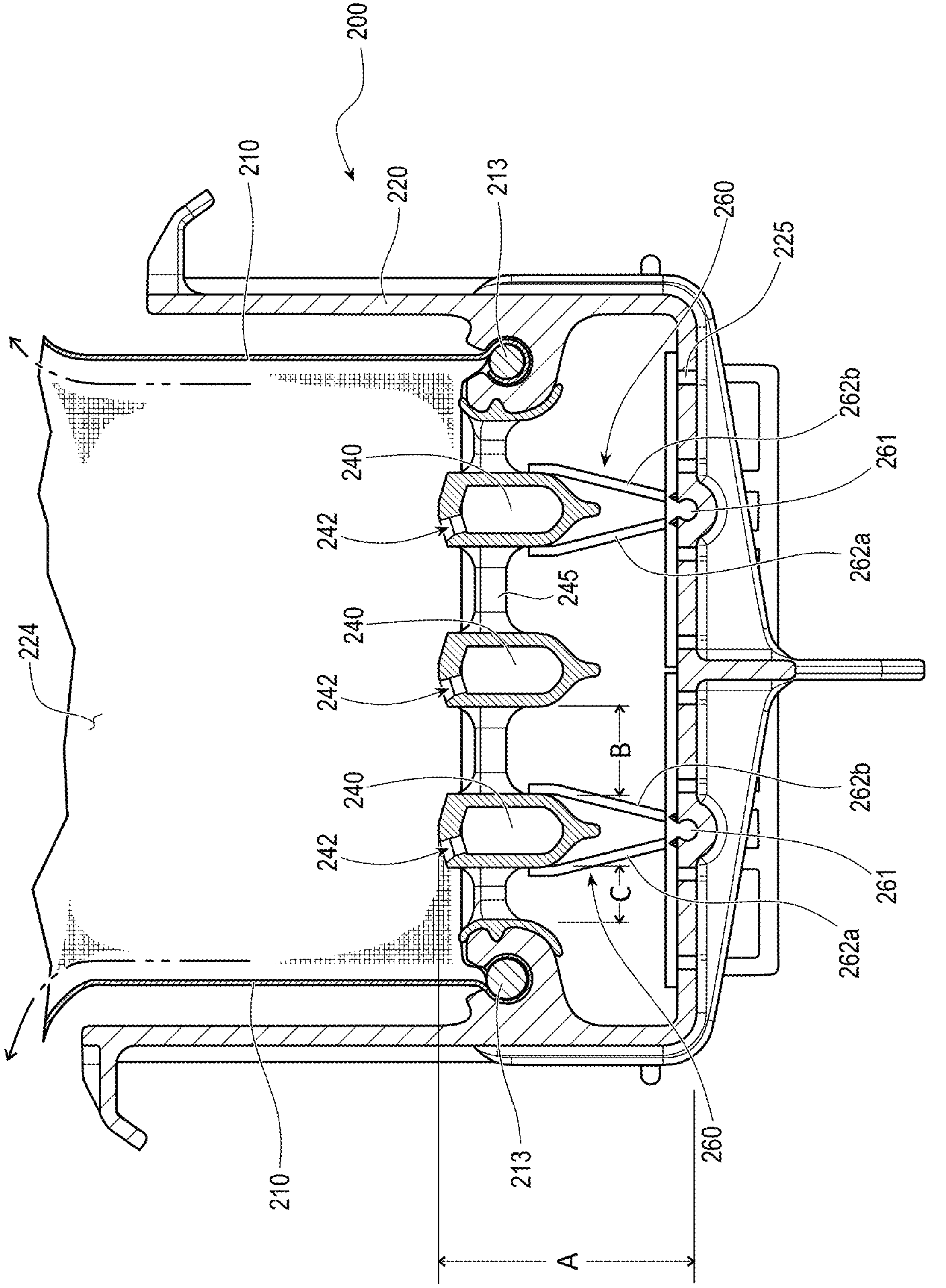
FIG. 3 is a cross-sectional view of the aspirating airbag inflation assembly of FIG. 2.

As shown in FIG. 3, assembly 200 may further comprise a valve assembly 260. Valve assembly 260 may comprise one or more valves preferably configured to automatically open upon actuation of the inflator and further configured to automatically close during inflation of the airbag cushion to prevent air and inflation gas from exiting through the aspiration inlet below the valve flaps of valve assembly 260. In some embodiments, the one or more valves of the valve assembly 260 may be configured to automatically close at a predetermined stage during inflation of the airbag cushion.

In the depicted embodiment, valve assembly 260 comprises a first valve 262*a* or valve flap and a second valve 262*b* or valve flap. Valves 262*a* and 262*b* may comprise flaps, such as butterfly flaps, which are configured to automatically open and close at least two separate openings of the aspiration inlet. In some embodiments, including the depicted embodiment, these flaps may be configured to open and close each of the openings defining the aspiration inlet. In the depicted embodiment, each of valves 262*a* and 262*b* comprises two flaps that are pivotably coupled to one another at a central portion, such as hinge portion 261, of the respective valves. Thus, as shown in FIG. 3, valves 262*a* and 262*b* may be configured to pivot to their respective open configurations during inflation by pivoting their respective flaps at this central portion/line 261.

In some embodiments, the valve flaps of valves assembly 260 may be sufficiently flexible such that the flaps flex during inflation. In some embodiments, however, these flaps may be sufficiently rigid so as to maintain a bias towards their respective closed configurations. In other words, the valves and/or valve flaps may be configured to require force to open (generated by a partial vacuum within an associated airbag cushion) and are otherwise biased towards their respective closed configurations. Although the valve flaps themselves may be configured to perform this function alone in some embodiments, in other embodiments, a support member of such valve flaps, such as a hinge, may be provided to facilitate a desired opening and closing function.

In some embodiments, the valve flaps may comprise a relatively rigid material (at least compared to the fabric of airbag cushion 224). In some embodiments, such valve flaps may be configured to operate in a desired manner simply by rigidly coupling such flaps adjacent to the aspiration inlet. Alternatively, flap(s) 262*a*/262*b* may be hinged at one end such that they are biased towards their respective closed positions. Some embodiments may comprise flaps that partially or fully overlap with one another.

Valve assembly 260 may, in some embodiments, be slidably couplable with aspiration housing 220. Thus, for example, a pivot point of the flaps 262*a*/262*b* of valve assembly 260 may comprise an elongated protrusion or bead 261, as shown in FIG. 3, which may be slidably received within a corresponding, elongated slot formed along the lower portion of aspiration housing 220. Both protrusions/beads 261 and their corresponding slot preferably comprise a bulbous lower portion and a narrowed neck portion to ensure that valve assembly 260 is kept in its proper position within aspiration housing 220.

Again, the cross-sectional view of FIG. 3 depicts flaps/valves 262*a* and 262*b* of valve assembly 260 in an open configuration during inflation of airbag cushion 224. As previously mentioned, by directing high-velocity inflation gas through inflation ports 242, a pressure differential is generated that preferably results in the opening of the valves and/or flaps of valve assembly 260 automatically (i.e., without further mechanical elements or other forces/actions). This allows the inflation of airbag cushion 224 to be supplemented by ambient air, which may enter airbag cushion 224 through the one or more openings of the aspiration inlet. Preferably, inflation ports 242 may be used to generate a sufficient pressure differential to allow for valve flaps 262*a*/262*b* to automatically open. This same pressure differential may then allow ambient air to assist with inflation of airbag cushion 224. Preferably, inflation gases are introduced in a forceful manner into airbag cushion 224. Thus, in addition to and/or as an alternative to the pressure differential, the velocity and/or rate of volume of gas delivered through ports 242 may be sufficient to cause ambient air to be entrained within the inflation gas and therefore aspirated into airbag cushion 224 along with this inflation gas.

At a desired point during inflation, valves and/or flaps 262*a*/262*b* of valve assembly 260 automatically close to prevent the air and inflation gases from escaping from, or at least reduce the amount of air and inflation gases that may escape from, airbag cushion 224. Again, this may be accomplished in a number of ways but, preferably, the valves and/or flaps of valve assembly 260 are biased, either by way of a hinge, by way of their physical makeup and coupling/pivot point(s) of attachment, or otherwise, towards their respective closed positions, preferably such that a threshold amount of force and/or pressure is required in order to reposition them to their open configurations, after which they automatically return to their closed configurations.

Thus, the valve(s)/flap(s) of valve assembly 260 are preferably configured to operate in a closed configuration initially, and then automatically open during inflation, which may be caused by generating a partial vacuum within the airbag cushion 224 by, for example, the inflation gas from an inflator. Following inflation, the system may be configured to automatically close again to maintain gases (both ambient air and inflation gas) in the cushion during occupant contact. The system may be specifically configured to provide for these three stages (closed, open during inflation, and re-closing during or following inflation) automatically at desired times by virtue of the positioning and configuration of the valve(s), conduits, ports, etc.

More specifically, upon initial deployment, there may be significant pressure achieved in the cushion 224 prior to the cushion 224 breaking through a cover (the "breakout phase" of the deployment). With this high pressure, the potential for leakage out the back of the housing is very high without blocking the aspiration inlet. Failure to block the aspiration inlet may also inhibit desired cushion restraint. Following the breakout phase, it is preferred that the aspiration inlet be opened as quickly as possible to allow for ambient air to assist in the inflation process.

Again, following the decrease of the pressure differential previously mentioned, a pressure differential developed in an opposite direction, and/or the cessation of inflation gases being delivered through inflation ports 242, valve flaps 262*a*/262*b* may be configured to automatically close again. As previously mentioned, in some embodiments, valve flaps 262*a*/262*b* may be biased towards their respective closed positions to facilitate this stage of inflation. One or more airbag cushion vents (not shown) may be used and may be tuned to provide desired deployment/restraint characteristics.

In the depicted embodiment, aspiration housing 220 comprises a pair of elongated channels 223 configured to receive a corresponding pair of elongated rails 213 formed on airbag cushion package 210, as shown in FIG. 3. This may allow airbag cushion package 210, aspiration housing 220, and inflation module 230 to be slidably coupled to one another, in some embodiments without use of, or at least substantially without the use of, any fasteners.

As also shown in these figures, inflation module 230 further comprises a frame defined by a plurality of support or cross members 245 extending perpendicular to the inflation conduits 240. Additional support members may extend parallel to conduits 240 in some cases. FIG. 3 further depicts the lower portion of the housing 220, which may define, at least in part, the aspiration inlet 225 of the assembly 200.

Figure 4:
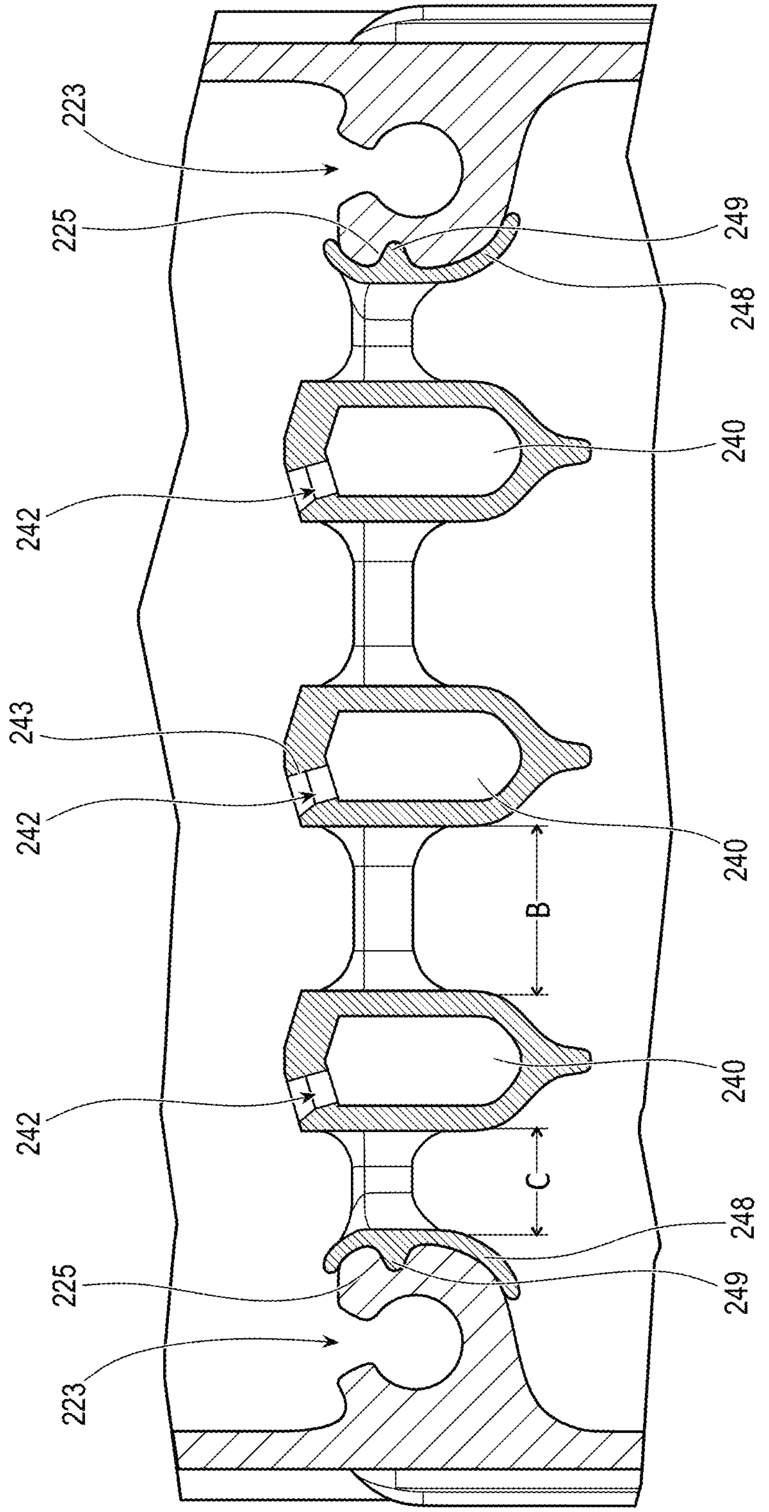
FIG. 4 is a close-up, cross-sectional view of the aspirating airbag inflation assembly of FIG. 2.

Various distances that may be important for efficiency are also shown in FIGS. 3 and 4. For example, distance A is shown, which is the distance from the inflation ports 242 to the upstream ambient air reservoir. In some cases, including the depicted embodiment, this distance may be the distance from one or more (in some cases, all), of the inflation ports 242 (in some cases, the outermost portion or surface thereof) to the aspiration inlet 225 of the assembly 200. In preferred embodiments, distance A may be between about 10 mm and about 50 mm. In some such embodiments, distance A may more preferably be between about 20 mm and about 40 mm. In some such cases, distance A may be about 36 mm.

The present inventor has discovered that providing for this preferred spacing improves aspiration efficiency. Such efficiency in connection with the disclosed design requires considerations of the swing radius of the flaps 262 and the size and geometry of the inflation tubes/conduits 240, which must be considered in conjunction with the more generic preference to decrease this distance to improve the amount of ambient air entrainment and packaging efficiency.

Other preferred distances are also shown in FIG. 3. For example, distance B is the distance between adjacent inflation tubes/conduits 240. In preferred embodiments, distance B may be between about 5 mm and about 25 mm. In some such embodiments, distance B may be between about 10 and about 20 mm. In some such embodiments, distance B may be about 14 mm.

Still another distance is shown in FIG. 3 that may be used to optimize the efficiency of the aspiration of the assembly 200. Distance C is the distance between the outermost inflation tube/conduit 240 and the adjacent flow-restricting and/or flow-limiting surface of the housing/assembly. In the depicted embodiment, the adjacent flow-limiting surface is the portion of the inner wall of aspiration housing 220 that projects inward to allow for receipt of rails 213. However, in other embodiments, distance C may be measured directly from the inner surface of the outer wall of housing 220 (see distance D in FIG. 5, for example). In some embodiments, distance C may be between about 5 mm and about 20 mm. In some such embodiments, distance C may be between about 5 and about 12 mm or, in a very specific example of a preferred embodiment, distance C may be about 8 mm.

FIG. 4 further depicts support members 248 that may be used in some embodiments to couple the various conduits 240 on opposite ends of the housing 220. As shown in FIG. 4, a pair of elongated grooves 225 may be formed within aspiration housing 220. In some embodiments, support members 248 may comprise protrusions 249 that may be received within grooves 225.

Figure 5:
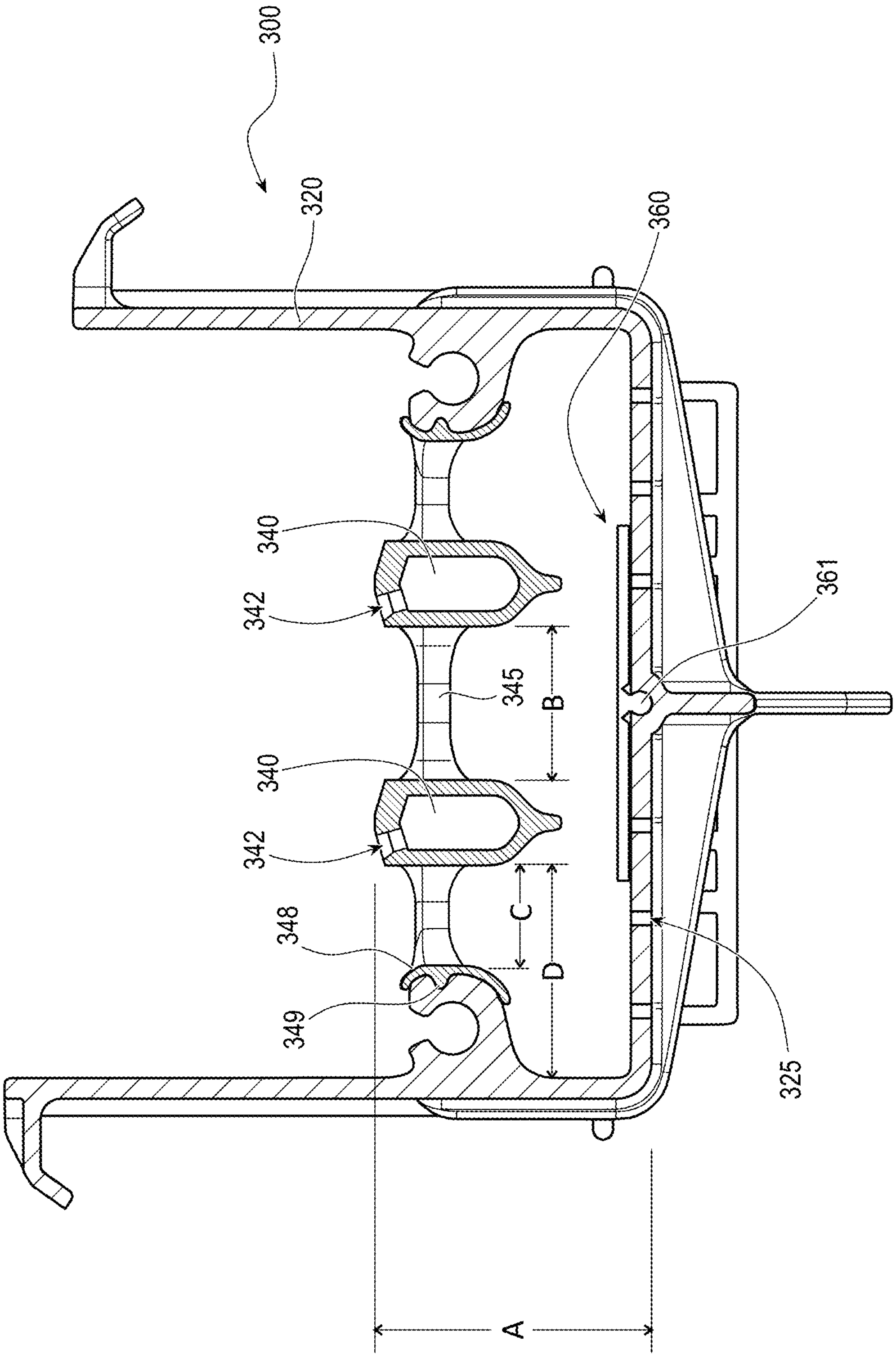
FIG. 5 is a cross-sectional view of an aspirating airbag inflation assembly according to other embodiments.

FIG. 5 depicts another aspirating airbag cushion assembly 300 according to other embodiments. Aspirating airbag cushion assembly 300 comprises an airbag cushion package and/or housing comprising an airbag cushion (not shown in this figure) positioned and configured to deploy therefrom. Aspirating airbag cushion assembly 300 further comprises an aspiration housing 320 coupled to the airbag cushion housing. The aspiration housing 320 may be similar to those previously discussed and may therefore comprise, for example, an aspiration inlet 325 configured to allow for receipt of ambient air into the airbag cushion during inflation.

Similarly, an inflation module (not shown in FIG. 5, but may be the same as previously depicted) may be coupled to the aspiration housing 320, which inflation module may comprise a plurality of inflation conduits/tubes 340 that are fluidly coupled with the inflator. Each of the inflation tubes 340 again comprises a plurality of inflation or aspiration ports 342 and each of the inflation tubes 340 and/or ports 342 is configured to deliver inflation gas from the inflator into the airbag cushion.

As previously mentioned, ports 342 may, in some embodiments, be angled outward away from the vertical direction, at least initially. In some such embodiments, the ports may be multi-faceted, multi-sectioned, and/or expanded in area from a proximal to distal direction. For example, angled surfaces, such as Prandtl-Meyer expansion angle surfaces, may direct the inflation gas from an initially outward direction to a vertical, or nearly vertical, direction to improve the efficiency of the aspiration of the adjacent, ambient air during deployment.

Assembly 300 may further comprise a valve assembly 360, which may comprise one or more valves preferably configured to automatically open upon actuation of the inflator and further configured to automatically close during inflation of the airbag cushion to prevent air and inflation gas from exiting through the aspiration inlet below the valve flaps of valve assembly 360. In some embodiments, the one or more valves of the valve assembly 360 may be configured to automatically close at a predetermined stage during inflation of the airbag cushion.

In the depicted embodiment, valve assembly 360 comprises two flaps that are pivotably coupled to one another at a central portion, such as hinge portion 361, of the respective valve. In some embodiments, the valve flaps of valves assembly 360 may be sufficiently flexible such that the flaps flex during inflation. In some embodiments, however, these flaps may be sufficiently rigid so as to maintain a bias towards their respective closed configurations. In other words, the valves and/or valve flaps may be configured to require force to open (generated by a partial vacuum within an associated airbag cushion) and are otherwise biased towards their respective closed configurations. Although the valve flaps themselves may be configured to perform this function alone in some embodiments, in other embodiments, a support member of such valve flaps, such as a hinge, may be provided to facilitate a desired opening and closing function. Although only a single pair of opposing valve flaps is shown in the figure, additional valves and/or valve flaps may be used, including but not limited to those shown in previous figures.

In some embodiments, the valve flaps may comprise a relatively rigid material (at least compared to the fabric of the airbag cushion). In some embodiments, such valve flaps may be configured to operate in a desired manner simply by rigidly coupling such flaps adjacent to the aspiration inlet. Alternatively, the flaps may be hinged at one end such that they are biased towards their respective closed positions. Some embodiments may comprise flaps that partially or fully overlap with one another.

In the depicted embodiment, aspiration housing 320 further comprises a frame defined by a plurality of support and/or cross members 345, which may extend parallel to and/or perpendicular to conduits 340. FIG. 5 further depicts the lower portion of the housing 320, which may define, at least in part, the aspiration inlet 325 of the assembly 300.

Various distances that may be important for efficiency are also shown in FIG. 5. For example, distance A is shown, which is the distance from the inflation ports 342 to the upstream ambient air reservoir. In some cases, including the depicted embodiment, distance A may be the distance from one or more (in some cases, all), of the inflation ports 342 (in some cases, the outermost portion or surface thereof) to the aspiration inlet 325 of the assembly 300. In preferred embodiments, distance A may be between about 10 mm and about 50 mm. In some such embodiments, distance A may be between about 20 mm and about 40 mm. In some specific such cases, distance A may be about 36 mm.

Other preferred distances are also shown in FIG. 5. For example, distance B is the distance between adjacent inflation tubes/conduits 340. In preferred embodiments, distance B may be between about 5 mm and about 25 mm. In some such embodiments, distance B may be between about 10 and about 20 mm. In some such embodiments, distance B may be about 14 mm.

Two additional distances are shown in FIG. 5 that may be used to optimize the efficiency of the aspiration of the assembly 300. Distance C is the distance between the outermost inflation tube/conduit 340 and the adjacent flow-restricting and/or flow-limiting surface of the housing/assembly. In the depicted embodiment, the adjacent flow-limiting surface is the portion of the inner wall of aspiration housing 320 that projects inward, thereby limiting or restricting the flow of ambient air into the cushion. In some embodiments, distance C may be between about 5 mm and about 20 mm. In some such embodiments, distance C may be between about 5 and about 12 mm or, in a very specific example of a preferred embodiment, distance C may be about 8 mm.

However, in other embodiments, the aforementioned flow-limiting surface may comprise the inner surface of the outer wall of housing 320 and therefore the aforementioned distance to an adjacent flow-limiting surface be measured directly from this inner surface rather than from an inwardly-projecting feature of the housing. For example, distance D is shown in FIG. 5. This distance is intended to suggest the absence of the inwardly projecting elongated channels that may, as previously described, be configured to receive a corresponding pair of elongated rails for receiving an airbag module within the aspiration housing 320.

In other words, in some embodiments, the structure terminating at support members 348—whereby elongated grooves 325 formed in the inwardly projecting channels may be configured to receive protrusions 349—may be absent and the support members 345 may extend all the way to the inner surface of housing 320, as indicated by distance D.

In some cases, distance D may therefore differ from distance C, depending upon the structure of the housing. For example, in some embodiments having two inlet tubes/conduits 340, as shown in FIG. 5, distance D (the distance from each of the outermost conduits 340 to the adjacent flow-limiting surface of the housing), which in this case may be simply the inner surface of the housing wall (again, assuming the inwardly projecting members/channels are removed), may be between zero (conceivably, the outer portion of the outermost conduit 340 could be attached directly to the inner surface of the housing wall with no spacing therebetween) and about 60 mm. In some such cases, distance D may be between zero (or about zero) and about 30 mm.

However, if the outermost conduits are spaced apart from the adjacent inner wall surface and/or adjacent flow-limiting surface, distance D may be between about 5 mm and about 30 mm. In some specific such embodiments, distance D may be about 8 mm.

Figure 6:
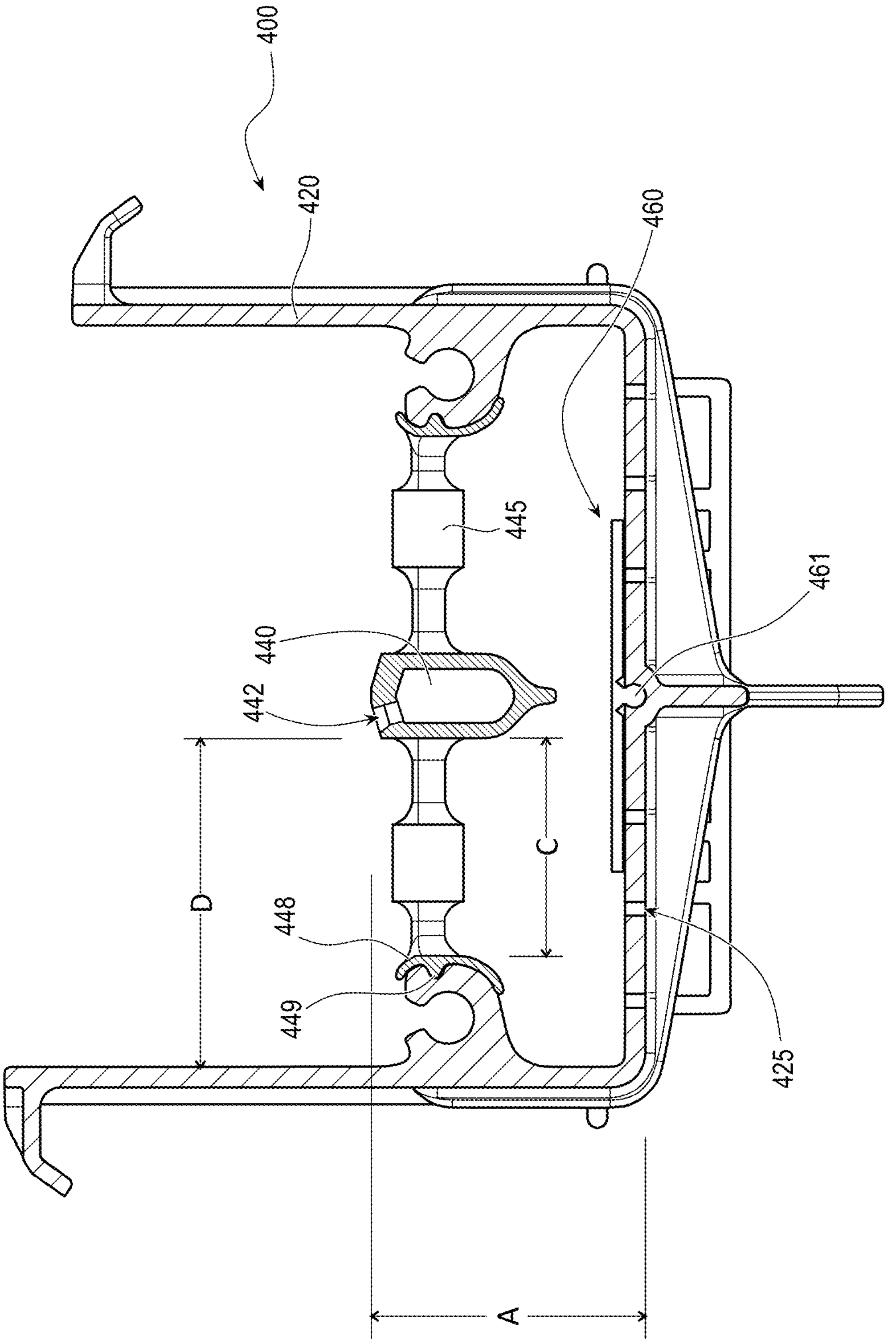
FIG. 6 is a cross-sectional view of an aspirating airbag inflation assembly according to still other embodiments.

A portion of another aspirating airbag cushion assembly 400 is shown in FIG. 6. As with previous embodiments, aspirating airbag cushion assembly 400 comprises an aspiration housing 420 comprising an airbag cushion (not shown in FIG. 6 for simplicity) positioned and configured to deploy therefrom. Aspiration housing 420 comprises an open side and/or opening at its upper side, which in some embodiments may be configured to couple with an airbag cushion housing of the assembly 400, as previously mentioned.

Aspiration housing 420 further comprises an aspiration inlet 425 configured to allow for receipt of ambient air into the airbag cushion during inflation, as discussed throughout this disclosure. As previously mentioned, in some embodiments, this aspiration inlet may comprise a plurality of openings aligned in a grid pattern along this open side of aspiration housing 420. However, it is contemplated that, in alternative embodiments, the aspiration inlet may comprise a single opening (in some such embodiments, the entire lower side of aspiration housing 420 may be open) or may comprise any other suitable number of openings as desired.

Similarly, an inflation module (not shown in FIG. 6) may be coupled to the aspiration housing 420, which inflation module may comprise, in the depicted embodiment, a single inflation conduit/tube 440 that is fluidly coupled with the inflator. Inflation tube 440 comprises a plurality of inflation or aspiration ports 442 configured to deliver inflation gas from the inflator into the airbag cushion.

Assembly 400 may further comprise a valve assembly 460, which, as previously discussed, may comprise one or more valves preferably configured to automatically open upon actuation of the inflator and further configured to automatically close during inflation of the airbag cushion to prevent air and inflation gas from exiting through the aspiration inlet below the valve flaps of valve assembly 460.

Valve assembly 460 may comprise any number of flaps that are pivotably coupled to one another at a central portion, such as hinge portion 461, of its respective valve.

Aspiration housing 420 may further comprise a frame defined by one or more support and/or cross members 445, which may extend parallel to and/or perpendicular to conduit 440.

Various distances that may be important for efficiency are, once again, shown in FIG. 6. For example, distance A is shown, which is the distance from the uppermost inflation port(s) 442 to the upstream ambient air reservoir. In some cases, including the depicted embodiment, distance A may be the distance from one or more (in some cases, all), of the inflation ports 442 (in some cases, the outermost portion or surface thereof) to the aspiration inlet 425 of the assembly 400. In preferred embodiments, distance A may be between about 10 mm and about 50 mm. In some such embodiments, distance A may be between about 20 mm and about 40 mm. In some specific such cases, distance A may be about 36 mm.

Distances C and D are also both shown in FIG. 6. Distance C is the distance from the single inflation tube/conduit 440 to the adjacent, inwardly projecting structure comprising elongated grooves configured to receive protrusions 449. Distance D is the distance from the single inflation tube/conduit 440 to the adjacent inner wall/surface of the housing 420.

Both distance C and distance D (when the aforementioned inwardly projecting structure is absent, for example) should be considered as examples of distances from an outermost inflation tube/conduit to an adjacent flow-limiting surface of the assembly that restricts incoming ambient airflow. Either distance C or distance D, in some embodiments, may be between about 15 mm and about 80 mm. More preferably, distances C and/or D may be between about 15 mm and about 45 mm. In an example of a specific embodiment within these parameters, distances C and/or D may be about 27 mm.

Notwithstanding these similarities, these distances are being depicted separately in FIG. 6 to illustrate how different structures in an aspiration housing can limit or restrict incoming ambient air and therefore can define a distance from an inflation conduit to an adjacent flow-limiting and/or flow-restricting surface, portion, and/or feature of an aspirating airbag housing.

Again, as previously mentioned, it is expected that, when distance D is the relevant distance under consideration, the support members 445 will likely extend all the way to the inner surface of housing 420, as indicated by distance D, without coupling to the inwardly protruding features shown in FIG. 6 (in other words, these inwardly protruding features are likely absent altogether from the assembly in such cases, despite their presence in FIG. 6).

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An aspirating airbag cushion assembly, comprising:
- an airbag cushion;
- a housing configured to allow for receipt of ambient air into the airbag cushion during inflation of the airbag cushion; and
- an inflation module comprising:
  - an inflator; and
  - a plurality of inflation conduits fluidly coupled with the inflator and configured to deliver inflation gas from the inflator,
    - wherein each of the plurality of inflation conduits comprises a plurality of inflation ports through which inflation gas is delivered,
    - wherein each of the plurality of inflation ports is configured to, upon actuation of the inflator, draw ambient air into the airbag cushion, and
    - wherein each of the plurality of inflation conduits is separated apart from each adjacent inflation conduit of the plurality of inflation conduits by a distance of between about 5 mm and about 25 mm.

2. The aspirating airbag cushion assembly of claim 1, wherein each of the plurality of inflation conduits comprises a first end adjacent to the airbag cushion and a second end opposite from the first end, wherein the second end is adjacent to an aspiration inlet of the housing, and wherein a distance between the aspiration inlet and the first end is less than 50 mm.

3. The aspirating airbag cushion assembly of claim 2, wherein the distance between the aspiration inlet and the first end is between about 10 mm and about 50 mm.

4. The aspirating airbag cushion assembly of claim 3, wherein the distance between the aspiration inlet and the first end is between 20 mm and 40 mm.

5. The aspirating airbag cushion assembly of claim 1, wherein each of the plurality of inflation conduits is separated from each adjacent inflation conduit of the plurality of inflation conduits by a distance of between 10 mm and 20 mm.

6. The aspirating airbag cushion assembly of claim 1, wherein a distance between an outermost inflation conduit of the plurality of inflation conduits and a flow-limiting surface of the housing is between about 5 mm and about 30 mm.

7. The aspirating airbag cushion assembly of claim 6, wherein the distance between the outermost inflation conduit of the plurality of inflation conduits and the flow-limiting surface of the housing is between 5 mm and 20 mm.

8. The aspirating airbag cushion assembly of claim 7, wherein the distance between the outermost inflation conduit of the plurality of inflation conduits and the flow-limiting surface of the housing is between 5 mm and 12 mm.

9. The aspirating airbag cushion assembly of claim 7, wherein the plurality of inflation conduits comprises at least three inflation conduits.

10. The aspirating airbag cushion assembly of claim 6, wherein the flow-limiting surface of the housing comprises an inwardly projecting surface of the housing.

11. An aspirating airbag cushion assembly, comprising:
- an airbag cushion;
- a housing configured to allow for receipt of ambient air into the airbag cushion during inflation of the airbag cushion, wherein the housing comprises an aspiration inlet opening configured to receive ambient air into the housing; and
- an inflation module comprising:
  - an inflator; and
  - at least one inflation conduit fluidly coupled with the inflator and configured to deliver inflation gas from the inflator,
    - wherein the at least one inflation conduit comprises a plurality of inflation ports through which inflation gas is delivered,
    - wherein each of the plurality of inflation ports is configured to, upon actuation of the inflator, draw ambient air into the airbag cushion, and
    - wherein a distance from each of the plurality of inflation ports to the aspiration inlet opening is less than about 50 mm.

12. The aspirating airbag cushion assembly of claim 11, wherein the distance from each of the plurality of inflation ports to the aspiration inlet opening is between 10 mm and 50 mm.

13. The aspirating airbag cushion assembly of claim 12, wherein the distance from each of the plurality of inflation ports to the aspiration inlet opening is between 20 mm and 40 mm.

14. The aspirating airbag cushion assembly of claim 11, wherein the distance is measured between a terminal end of each of the plurality of inflation ports and an external end of the aspiration inlet opening through which ambient air enters the housing.

15. The aspirating airbag cushion assembly of claim 11, wherein the distance from each of the plurality of inflation ports to the aspiration inlet opening is less than 50 mm.

16. An aspirating airbag cushion assembly, comprising:
- an airbag cushion;
- a housing configured to allow for receipt of ambient air into the airbag cushion during inflation of the airbag cushion, wherein the housing comprises an aspiration inlet opening configured to receive ambient air into the housing; and
- an inflation module comprising:
  - an inflator; and
  - a single inflation conduit fluidly coupled with the inflator and configured to deliver inflation gas from the inflator,
    - wherein the single inflation conduit comprises a plurality of inflation ports through which inflation gas is delivered,
    - wherein each of the plurality of inflation ports is configured to, upon actuation of the inflator, draw ambient air into the airbag cushion, and
    - wherein a distance between an outer edge of the single inflation conduit and an adjacent flow-limiting surface of the housing is between about 15 mm and about 45 mm.

17. The aspirating airbag cushion assembly of claim 16, wherein the adjacent flow-limiting surface of the housing comprises an inwardly-projecting member.

18. The aspirating airbag cushion assembly of claim 17, wherein the inwardly-projecting member comprises an airbag cushion mounting feature.

19. The aspirating airbag cushion assembly of claim 16, wherein the distance is between 15 and 30 mm.

20. The aspirating airbag cushion assembly of claim 16, wherein a distance between an upper end of the single inflation conduit adjacent to the airbag cushion and the aspiration inlet opening is less than 50 mm.

* * * * *